(12) United States Patent
Ohuchida

(10) Patent No.: US 7,307,938 B2
(45) Date of Patent: Dec. 11, 2007

(54) OPTICAL PICKUP APPARATUS HAVING AN IMPROVED HOLOGRAPHIC UNIT, AND OPTICAL DISK DRIVE INCLUDING THE SAME

(75) Inventor: Shigeru Ohuchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 208 days.

(21) Appl. No.: 10/995,318

(22) Filed: Nov. 24, 2004

(65) Prior Publication Data

US 2005/0088948 A1 Apr. 28, 2005

Related U.S. Application Data

(62) Division of application No. 09/922,746, filed on Aug. 7, 2001, now Pat. No. 6,937,554.

(30) Foreign Application Priority Data

| Aug. 9, 2000 | (JP) | ............................. 2000-240759 |
| Oct. 18, 2000 | (JP) | ............................. 2000-318133 |
| Jun. 13, 2001 | (JP) | ............................. 2001-178342 |

(51) Int. Cl.
*G11B 7/135* (2006.01)

(52) U.S. Cl. ............................. 369/112.15; 369/112.1; 369/112.04; 369/112.05

(58) Field of Classification Search ...................... None
See application file for complete search history.

(56) References Cited

U.S. PATENT DOCUMENTS

| 5,428,588 A | 6/1995 | Ohuchida |
| 5,684,779 A | 11/1997 | Ohuchida et al. |
| 5,894,464 A | 4/1999 | Kim et al. |
| 6,072,579 A | 6/2000 | Funato |
| 6,366,548 B1 | 4/2002 | Ohyama |
| 6,552,990 B1 | 4/2003 | Kajiyama et al. |
| 6,584,060 B1 | 6/2003 | Oohchida et al. |
| 2001/0026523 A1 | 10/2001 | Ohuchida et al. |
| 2001/0050892 A1 | 12/2001 | Takahashi et al. |
| 2002/0024916 A1 | 2/2002 | Ueyama et al. |
| 2002/0024920 A1 | 2/2002 | Takahashi |

FOREIGN PATENT DOCUMENTS

EP      0 831 469 A2    3/1998

(Continued)

*Primary Examiner*—William R. Korzuch
*Assistant Examiner*—Jorge L. Ortiz Criado
(74) *Attorney, Agent, or Firm*—Dickstein Shapiro LLP

(57) ABSTRACT

In an optical pickup apparatus of the present invention, either a first laser diode emits a laser beam having a first wavelength or a second laser diode emits a laser beam having a second wavelength. An optical system focuses one of the two laser beams onto a recording surface of an optical recording medium. A photodetector unit receives reflection beams, which are reflected from the recording medium, to generate detection signals from the received reflection beams. A holographic unit has a first hologram suited to the first laser diode and a second hologram suited to the second laser diode, the first hologram provided to diffract a reflection beam of the laser beam of the first laser diode to the photodetector unit, and the second hologram provided to diffract a reflection beam of the laser beam of the second laser diode to the photodetector unit.

9 Claims, 20 Drawing Sheets

FOREIGN PATENT DOCUMENTS

| | | |
|---|---|---|
| EP | 0 881 635 A2 | 12/1998 |
| EP | 0 881 635 A3 | 1/1999 |
| EP | 1 001 413 A2 | 5/2000 |
| EP | 1 047 051 A2 | 10/2000 |
| JP | 9-120568 | 5/1997 |
| JP | 9-180207 | 7/1997 |
| JP | 10319318 | 12/1998 |
| JP | 11-39701 | 2/1999 |
| JP | 11-296893 | 10/1999 |
| JP | 2000076689 A | 3/2000 |
| JP | 2000132862 | 5/2000 |
| JP | 2000-215496 | 8/2000 |

780nm LASER HOLOGRAM REGION

650nm LASER HOLOGRAM REGION

10 ⸺ ▭ 780nm LASER FOCUSING DETECTION REGION

12 ⸺ ▭ 780nm LASER TRACKING DETECTION REGION

13 ⸺ ▭ 650nm LASER TRACKING DETECTION REGION 11  650nm LASER FOCUSING DETECTION REGION

PHASE DIFFERENCE

OPTICAL PICKUP APPARATUS HAVING AN IMPROVED HOLOGRAPHIC UNIT, AND OPTICAL DISK DRIVE INCLUDING THE SAME

CROSS REFERENCE TO RELATED APPLICATIONS

The present application is a divisional of U.S. application Ser. No. 09/922,746, filed Aug. 7, 2001, now U.S. Pat. No. 6,937,554, the disclosure of which is herewith incorporated by reference in its entirety.

BACKGROUND OF THE INVENTION

1. Field of The Invention

The present invention relates to an optical pickup apparatus that records information to and reproduces information from an optical recording medium at high speed while maintaining photo-detection performance. Further, the present invention relates to an optical disk drive including the optical pickup apparatus.

2. Description of The Related Art

As disclosed in "Development of 7.3 mm Height DVD Optical Pickup Using TWIN-LD; 7th Microoptics Conference Jul. 14-16 1999", a monolithic two-LD optical pickup device is known. In this optical pickup device, a photodiode (PD) chip and a monolithic integrated optical circuit, including a 650 nm laser diode (LD) and a 780 nm laser diode (LD), are packaged into a single optical module. The 650 nm LD emits a laser beam having the wavelength $\lambda 1=650$ nm, which is used to play a DVD medium, and the 780 nm LD emits a laser beam having the wavelength $\lambda 2=780$ nm, which is used to play a CD medium. The two-LD optical pickup device includes an optical system that focuses the laser beam, emitted by one of the 650 nm LD and the 780 nm LD, onto a recording medium using a common optical path. The PD chip detects the reflection beams that are reflected from the recording medium for each of the laser beams having different wavelengths.

In order to allow the single PD chip to receive each of the laser beams emitted by the two laser diodes having different emission points, the two-LD optical pickup device is configured to meet the relationship between an emission-point distance $\Delta L$ of the two laser diodes and an LD-to-PD distance L: $\Delta L = ((\lambda 2 - \lambda 1)/\lambda 1) \times L$. Specifically, the two-LD optical pickup device has the emission-point distance $\Delta L = 0.24$ mm, and the LD-to-PD distance $L = 1.2$ mm.

However, the optical system of an optical pickup device, which requires high-precision beam matching, must have an adequately small focal length of the collimator lens. The emission-point distance $\Delta L$ of the above optical pickup device is too large to meet the requirement. It must be reduced to about 0.1 mm in order to suit the above optical pickup device for the high-precision beam matching. If the focal length of the collimator lens is small but the emission-point distance is large, the diverging angle of the laser beams collimated by the collimator lens is large and the collimated laser beams are obliquely incident to the objective lens. This will make the focusing of the laser beam onto the recording medium inappropriate.

In the above-described optical pickup device, when the emission-point distance $\Delta L$ is set to about 0.1 mm, the LD-to-PD distance L is nearly equal to 0.5 mm. The LD-to-PD distance is too small to ensure high-speed operation of the PD chip. The heat generated by the two LDs will influence the PD chip, and the high-speed operation of the PD chip will be difficult.

Japanese Laid-Open Patent Application No.9-120568 discloses a hybrid two-LD optical pickup device provided with a single optical module in which a 650 nm LD, a 780 nm LD and a PD chip are packaged. This optical pickup device uses a single hologram for allowing the recording and reproducing of several recording media. The positional accuracy of the emission points of this optical pickup device is not as high as that of the above-mentioned monolithic LD circuit. But, the laser diodes having the output performance needed for the optical pickup device can be selected, and the chip yield is better than that of the above monolithic LD device.

In the case of the optical pickup device disclosed in Japanese Laid-Open Patent Application No.9-120568, it is difficult to perform the adjustment of the single hologram so as to make the offset of the two laser wavelengths small. This will raise the cost. Further, it is very difficult to maintain high accuracy of the packaging of the 650 nm LD, the 780 nm LD and the PD chip.

Moreover, as disclosed in "DVD/CD Optical Pickup Using Integrated Module Having Red/Infrared Laser Diodes and Photodetector; 47th Applied Physics Conference March 2000", a hybrid two-LD optical pickup device in which the 650 nm LD and the 780 nm LD are arranged in parallel is known. A CD hologram and a DVD hologram are separately provided and they are adjusted independently. In this optical pickup device, the LD-to-LD distance is set to 1.1 mm, and the 650 nm laser beam does not pass through the CD hologram. The emission-point distance is 1.1 mm, and an optical axis compensating prism is provided in the optical system so that the optical axes of the 650 nm and 780 nm laser beams are suitably coupled.

However, in the above-mentioned optical pickup device, the optical axis compensating prism is expensive and large in size. In the optical pickup device that records information to an optical disk, the focal length of the collimator lens must be small. There is a problem in that the optical axis compensating prism cannot be arranged in such an optical pickup device.

As described in the foregoing, the hybrid optical pickup device is more appropriate, in optimizing the Photo-detection performance to suit for the specifications of the optical disk drive, than the monolithic optical pickup device. In addition, the hybrid optical pickup device has the advantageous feature that it is suitable for creating a low-cost, high-performance optical disk drive.

On the other hand, the hybrid optical pickup device requires separate positioning of the laser diodes onto the optical module, and an assembly error of the laser diodes mounted on the optical module is likely to occur, and the accuracy of the emission-point distance of the laser diodes is relatively low.

SUMMARY OF THE INVENTION

An object of the present invention is to provide an improved optical pickup apparatus in which the above-described problems are eliminated.

Another object of the present invention is to provide an optical pickup apparatus which has an improved holographic unit to efficiently moderate the requirement of assembly accuracy of the laser diodes and the photodiode mounted on the optical module, so that the optical pickup device provides good photo-detection performance and high-speed recording/reproducing capabilities.

Another object of the present invention is to provide a small-size, low-cost optical disk drive that provides good photo-detection performance and high-speed recording/reproducing capabilities by using an improved optical pickup apparatus.

The above-mentioned objects of the present invention are achieved by an optical pickup apparatus for accessing an optical recording medium, comprising: a light source unit which emits one of a plurality of laser beams having different wavelengths, the light source unit including a first laser diode emitting a laser beam having a first wavelength and a second laser diode emitting a laser beam having a second wavelength; an optical system which focuses the one of the plurality of laser beams, emitted by the light source unit, onto a recording surface of the recording medium; a photodetector unit which receives reflection beams, reflected from the recording medium in response to the one of the plurality of laser beams focused by the optical system, to generate detection signals from the received reflection beams; and a holographic unit which has a first hologram suited to the first laser diode and a second hologram suited to the second laser diode, the first hologram provided to diffract a reflection beam of the laser beam of the first laser diode to the photodetector, the second hologram provided to diffract a reflection beam of the laser beam of the second laser diode to the photodetector.

The above-mentioned objects of the present invention are achieved by an optical disk drive including an optical pickup apparatus, the optical pickup device comprising: a light source unit which emits one of a plurality of laser beams having different wavelengths, the light source unit including a first laser diode emitting a laser beam having a first wavelength and a second laser diode emitting a laser beam having a second wavelength; an optical system which focuses the one of the plurality of laser beams, emitted by the light source unit, onto a recording surface of an optical recording medium; a photodetector unit which receives reflection beams, reflected from the recording medium in response to the one of the plurality of laser beams focused by the optical system, to generate detection signals from the received reflection beams; and a holographic unit which has a first hologram suited to the first laser diode and a second hologram suited to the second laser diode, the first hologram provided to diffract a reflection beam of the laser beam of the first laser diode to the photodetector, the second hologram provided to diffract a reflection beam of the laser beam of the second laser diode to the photodetector.

According to the optical pickup apparatus of the present invention, in the holographic unit, the first hologram is provided to diffract a reflection beam of the laser beam of the first laser diode to the photodetector, and the second hologram is provided to diffract a reflection beam of the laser beam of the second laser diode to the photodetector. The improved holographic unit efficiently moderates the requirement of assembly accuracy of the laser diodes and the photodiode mounted on the optical module, and the optical pickup device provides good photo-detection performance and high-speed recording/reproducing capabilities. The optical pickup apparatus of the present invention is effective in providing a small-size, low-cost optical disk drive that provides good photo-detection performance and high-speed recording/reproducing capabilities.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
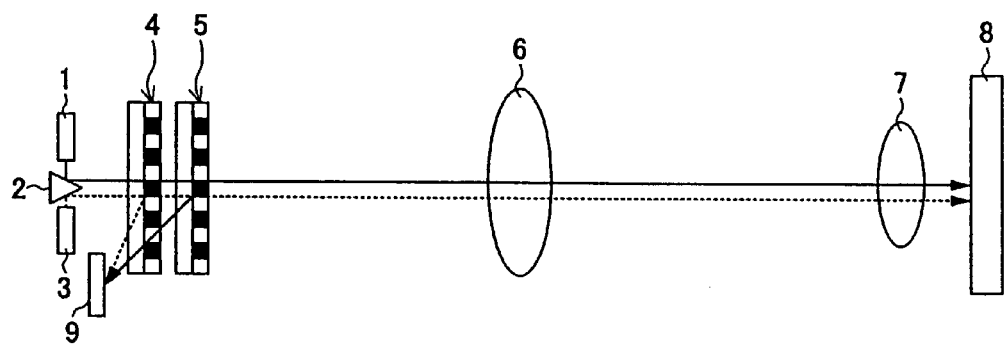
FIG. 1 is a diagram of a first preferred embodiment of the optical pickup apparatus of the invention.

FIG. 1 shows a first preferred embodiment of the optical pickup apparatus of the invention.

As shown in FIG. 1, the optical pickup device of the present invention accesses an optical recording medium 8. In the present embodiment, the optical recording medium 8 is, for example, a CD or a DVD. Hereinafter, "access" means to record data onto the recording medium 8, reproduce data from the recording medium 8, or erase data on the recording medium 8 by irradiating the recording medium 8 with light. The optical pickup apparatus of the present. embodiment generally includes a 650 nm LD (laser diode) 1, a coupling mirror 2, a 780 nm LD 3, a first hologram 4, a second hologram 5, a collimator lens 6, an objective lens 7, and a photodetector 9.

The 650 nm LD 1 emits a first laser beam having the wavelength 650 nm. The optical path of the first laser beam in the optical pickup device is indicated by the solid line in FIG. 1. The coupling mirror 2 reflects the first laser beam, received from the 650 nm LD 1, toward the recording medium 8. The first laser beam, reflected from the coupling mirror 2, passes through the first and second holograms 4 and 5 and is incident to the collimator lens 6. The collimator lens 6 converts the incident laser beam into a collimated laser beam, and the collimated laser beam is incident to the objective lens 7. The objective lens 7 focuses the incident laser beam onto a recording surface of the recording medium 8.

The reflection beam that is reflected from the recording surface of the recording medium 8 is returned along the optical path and it is incident to the second hologram 5. The second hologram 5 diffracts the incident reflection beam, having the wavelength 650 nm, to the photodetector 9. The photodetector 9 receives the diffracted beams from the second hologram 5 to generate detection signals based on the received beams.

In the present embodiment, each of the first hologram 4 and the second hologram 5 is configured into a holographic grating having a holographic pattern formed on a glass substrate. The first hologram 4 is provided to diffract the incident 780 nm laser beam to the photodetector 9. The second hologram 5 is provided to diffract the incident 650 nm laser beam to the photodetector 9.

Similarly, in the optical pickup apparatus of FIG. 1, the 780 nm LD 3 emits a second laser beam having the wavelength 780 nm. The optical path of the second laser beam in the optical pickup device is indicated by the dotted line in FIG. 1. The coupling mirror 2 reflects the second laser beam, received from the LD 3, toward the recording medium 8. The second laser beam, reflected from the coupling mirror 2, passes through the first and second holograms 4 and 5, and it is incident to the collimator lens 6. The collimator lens 6 converts the incident laser beam into a collimated laser beam, and the collimated laser beam is incident to the objective lens 7. The objective lens 7 focuses the incident laser beam onto the recording surface of the recording medium 8.

The reflection beam that is reflected from the recording surface of the recording medium 8 in response to the second laser beam is returned along the optical path and it is incident to the first hologram 4. The first hologram 4 diffracts the incident reflection beam, having the wavelength 780 nm, to the photodetector 9. The photodetector 9 receives the diffracted beams from the first hologram 4 to generate detection signals based on the received beams.

In the above-described embodiment, the first hologram 4 is provided to diffract the reflection beam of the laser beam of the 780 nm LD 3 to the photodetector 9, and the second hologram 5 is provided to diffract the reflection beam of the laser beam of the 650 nm LD 1 to the photodetector 9. The first and second holograms 4 and 5 efficiently moderate the requirement of assembly accuracy of the laser diodes and the photodiode mounted on the optical module, and the optical pickup device of the present embodiment provides good photo-detection performance and high-speed recording/reproducing capabilities.

Figure 2:
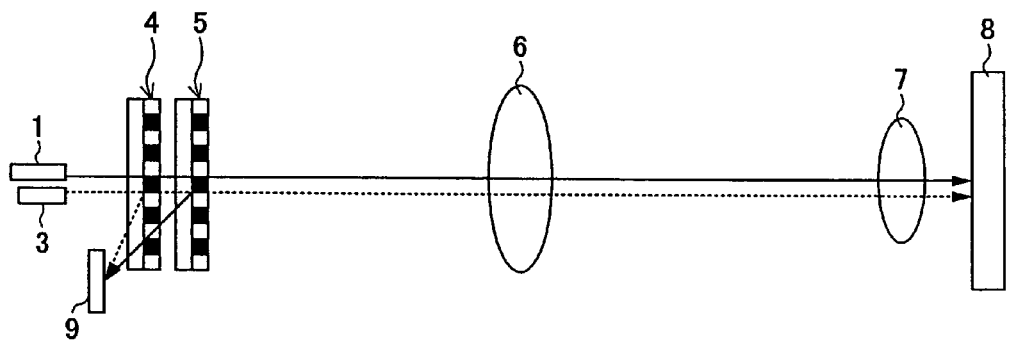
FIG. 2 is a diagram of a second preferred embodiment of the optical pickup apparatus of the invention.

FIG. 2 shows a second preferred embodiment of the optical pickup apparatus of the invention. In FIG. 2, the elements that are essentially the same as corresponding elements in FIG. 1 are designated by the same reference numerals, and a description thereof will be omitted.

As shown in FIG. 2, in the optical pickup apparatus. of the present embodiment, the coupling mirror 2 is not provided. The 650 nm LD 1 and the 780 nm LD 3 are arranged in parallel such that the laser beams emitted by the two laser diodes 1 and 3 are incident to the first hologram 4 and the second hologram 5. The assembly positions of the laser diodes 1 and 3 are not limited to specific positions of an LD/PD optical module. The configuration of the optical pickup apparatus of FIG. 2 is applicable to the embodiments of FIG. 13, FIG. 16, FIG. 18 and FIG. 22, which will be described later.

Figure 3A:
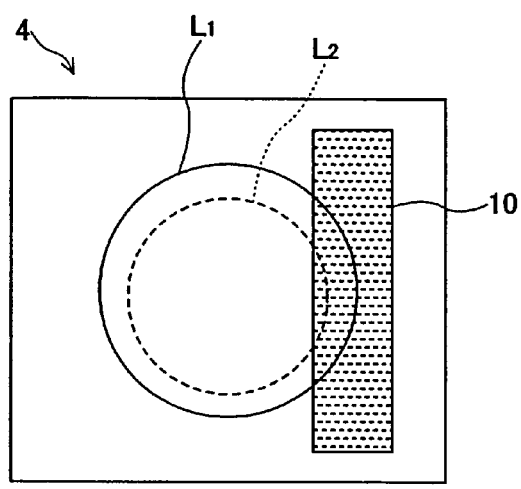
FIG. 3A and FIG. 3B are diagrams of a first hologram and a second hologram in the optical pickup apparatus of FIG. 1.
Figure 3B:
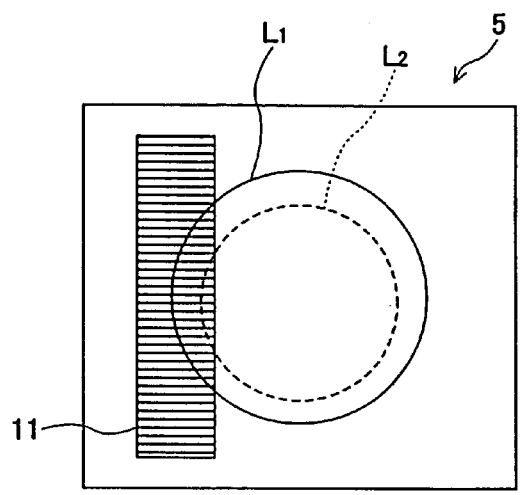

FIG. 3A and FIG. 3B respectively shows the first hologram 4 and the second hologram 5 in the optical pickup apparatus of FIG. 1. In FIG. 3A and FIG. 3B, "L1" indicates a 650 nm laser beam, and "L2" indicates a 780 nm laser beam.

As shown in FIG. 3A, the first hologram 4 includes a 780 nm laser focusing detection region 10 in the light-receiving surface thereof, and this detection region 10 has a holographic pattern needed for the focusing detection of the 780 nm laser beam that is incident to the first hologram 4 as the reflection beam. As shown in FIG. 3B, the second hologram 5 includes a 650 nm laser focusing detection region 11 in the light-receiving surface thereof, and this detection region 11 has a holographic pattern needed for the focusing detection of the 650 nm laser beam that is incident to the second hologram 5 as the reflection beam.

Figure 4:
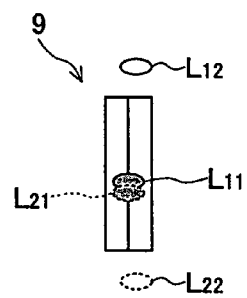
FIG. 4 is a diagram for explaining a relationship between a light-receiving surface of a photodetector and beam spots of diffracted laser beams from the first and second holograms.

FIG. 4 shows a relationship between a light-receiving surface of the photodetector 9 and beam spots of diffracted beams from the first and second holograms 4 and 5. In FIG. 4, "L11" indicates a position of the beam spot that is formed on the light-receiving surface of the photodetector 9 by the 650 nm diffracted beam from the second hologram 5, "L12" indicates a position of the beam spot that is formed by the 650 nm diffracted beam from the first hologram 4, "L21" indicates a position of the beam spot that is formed on the light-receiving surface of the photodetector 9 by the 780 nm diffracted beam from the first hologram 4, and "L22" indicates a position of the beam spot that is formed by the 780 nm diffracted beam from the second hologram 5.

The optical pickup apparatus of the present embodiment employs the knife-edge (KE) method to perform the focusing detection. The first hologram 4 is suited to the 780 nm LD 3, and it is provided to diffract the reflection beam of the 780 nm laser beam, received from the recording medium 8, to the photodetector 9. The focusing detection region 10 of the first hologram 4 serves to perform this diffraction function. The positioning of the beam spot "L21" of the 780 nm diffracted beam on the light-receiving surface of the photodetector 9 is adjusted by rotating the first hologram 4 around the optical axis of the first hologram 4. Hence, by making the adjustment, the center of the beam spot "L21" matches with the centerline of the 2-division photodiodes of the photodetector 9 with good accuracy. This makes it possible that the optical pickup apparatus of the present embodiment provide good photo-detection performance with respect to the 780 nm laser beam.

The reflection beam of the 650 nm laser beam is also incident to the 780 nm focusing detection region 10 of the first hologram 4. When the LD 1 is turned ON to emit the 650 nm laser beam, the detection region 10 of the first hologram 4 diffracts the reflection beam of the 650 nm laser beam to a position outside the light-receiving surface of the photodetector 9. The diffraction angle of the 650 nm laser beam at the first hologram 4 is smaller than that of the 780 nm laser beam. As shown in FIG. 4, the position of the beam spot "L12" deviates from the light-receiving surface of the photodetector 9, and the beam spot "L12" does not affect the photo-detection of the optical pickup apparatus.

The second hologram 5 is suited to the 650 nm LD 1, and it is provided to diffract the reflection beam of the 650 nm laser beam, received from the recording medium 8, to the photodetector 9. The focusing detection region 11 of the second hologram 5 serves to perform this diffraction function. The positioning of the beam spot "L1" of the 650 nm diffracted beam on the light-receiving surface of the photodetector 9 is adjusted by rotating the second hologram 5 around the optical axis of the second hologram 5. Hence, by making the adjustment, the center of the beam spot "L11" matches with the centerline of the 2-division photodiodes of the photodetector 9 with good accuracy. This makes it possible that the optical pickup apparatus of the present embodiment provide good photo-detection performance with respect to the 650 nm laser beam.

The reflection beam of the 780 nm laser beam is also incident to the 650 nm focusing detection region 11 of the second hologram 5. When the LD 2 is turned ON to emit the 780 nm laser beam, the detection region 11 of the second hologram 5 diffracts the reflection beam of the 780 nm laser beam to a position outside the light-receiving surface of the photodetector 9. The diffraction angle of the 780 nm laser beam at the second hologram 5 is larger than that of the 650 nm laser beam. As shown in FIG. 4, the position of the beam spot "L22" deviates from the light-receiving surface of the photodetector 9, and the beam spot "L22" does not affect the photo-detection of the optical pickup apparatus.

Accordingly, the first and second holograms 4 and 5 of the present embodiment efficiently moderate the requirement of assembly accuracy of the laser diodes and the photodiode mounted on the optical module, and the optical pickup device of the present embodiment provides good photo-detection performance and high-speed recording/reproducing capabilities.

In the optical pickup apparatus of FIG. 1, the function of the coupling mirror 2 to reflect the emission laser beams from the LD 1 and the LD 3 is provided to allow the distance of the optical paths of the 650 nm and 780 nm laser beams within the optical pickup apparatus to be set to only about 100 μm. Hence, the beam spot "L11" and the beam spot "L21" are arranged on the light-receiving surface of the photodetector 9 such that the two beam spots are apart from each other by only about 100 μm. The positions of the beam spots substantially match with each other.

Similarly, in the optical pickup apparatus of FIG. 2 wherein the coupling mirror 2 is not provided, it is necessary that the emission-point distance of the LD 1 and LD 3 is as small as 100 μm.

Figure 5A:
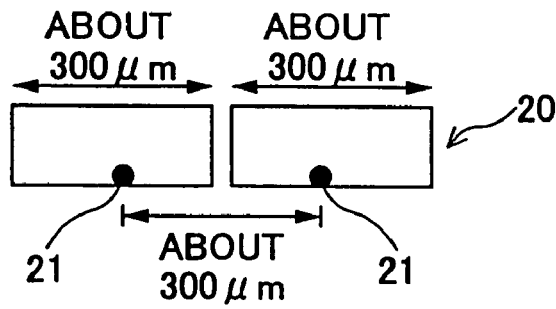
FIG. 5A and FIG. 5B are diagrams for explaining the emission point distance of LD chips in the optical pickup apparatus of FIG. 2.
Figure 5B:
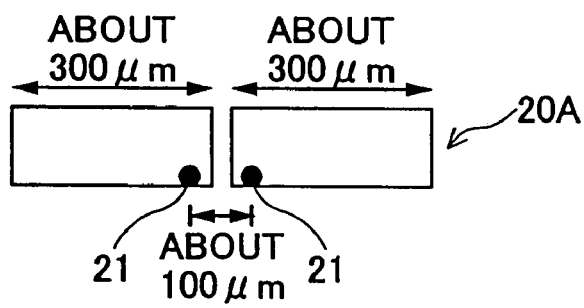

FIG. 5A and FIG. 5B show the emission-point distance of LD chips in the optical pickup apparatus of FIG. 2. Specifically, FIG. 5A shows the emission-point distance when normal LD chips 20 are arranged in parallel. FIG. 5B shows the emission-point distance when improved LD chips 20A according to the present invention are arranged in parallel.

As shown in FIG. 5A, each of the normal LD chips 20 has a width of about 300 μm, and has a centered emission point 21. When the normal LD chips 20 are arranged in parallel, the emission-point distance is as large as about 300 μm. Hence, it is impossible to make the emission-point distance of the LD 1 and LD 3 as small as 100 μm.

As shown in FIG. 5B, each of the LD chips 20A in the present embodiment has a width of about 300 μm, but has a decentered emission point 21. When the LD chips 20A are arranged in parallel, the distance between the decentered emission points of the LD 1 and LD 3 is as small as about 100 μm. Hence, according to the present embodiment, the emission-point distance of the LD 1 and LD 3 can be made as small as about 100 μm.

Therefore, the optical pickup apparatus of FIG. 2 efficiently moderates the requirement of assembly accuracy of the laser diodes and the photodiode mounted on the optical module, and the optical pickup device of the present embodiment provides good photo-detection performance and high-speed recording/reproducing capabilities. According to the present embodiment, there is no need to use the expensive optical-axis compensating prism as in the conventional optical pickup device disclosed in "DVD/CD Optical Pickup Using Integrated Module Having Red/Infrared Laser Diodes and Photodetector; 47th Applied Physics Conference March 2000".

As described above with reference to FIG. 4, the photodetector 9 in the present embodiment is provided to receive the diffracted beams from each of the first hologram 4 and the second hologram 5. There is no need to increase the number of the photodiodes used in the optical pickup apparatus. It is possible to provide a simple structure of the optical pickup apparatus with low cost.

Next, a description will be provided of tracking detection of the optical pickup apparatus of the present invention with reference to FIG. 6 through FIG. 9.

Figure 6:
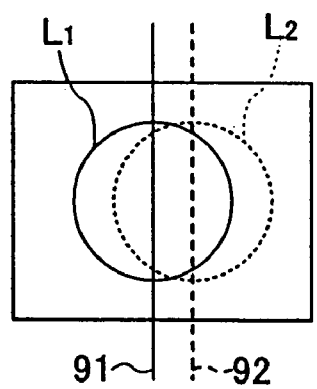
FIG. 6 is a diagram for explaining a push-pull method of tracking detection used by the optical pickup apparatus of the invention.

FIG. 6 shows a push-pull method of tracking detection used by the optical pickup apparatus of the invention. As shown in FIG. 6, the 650 nm laser beam L1 and the 780 nm laser beam are overlapped on each of the first hologram 4 and the second hologram 5. The deviation of the two beams is approximately equal to the emission-point distance (=100 μm). In order to perform the tracking detection for each of the 650 nm laser beam L1 and the 780 nm laser beam L2, it is necessary to selectively use one of a beam partition line 91 and a beam partition line 92. The beam partition line 91 is provided to partition the 650 nm laser beam L1 into two halves, and the beam partition line 92 is provided to partition the 780 nm laser beam L2 into two halves.

Figure 7:
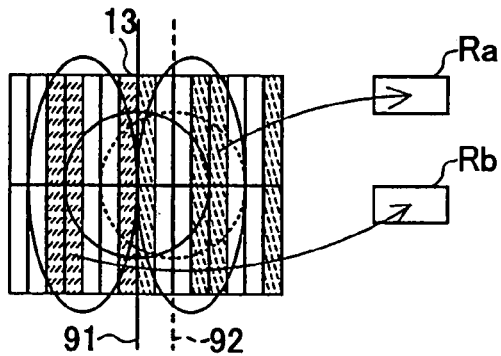
FIG. 7 is a diagram for explaining a tracking detection region of a hologram used when performing the push-pull method of tracking detection.

FIG. 7 shows a 650 nm laser tracking detection region 13 of a hologram used when performing the push-pull method of tracking detection. As shown in FIG. 7, the tracking detection region 13 comprises a pattern of rectangles, each having holographic stripes, which are symmetrically arranged on the hologram with respect to the beam partition line 91. The tracking detection region 13 of the hologram diffracts the reflection beam of the 650 nm laser beam to a photodiode portion Ra and a photodiode portion Rb of the photodetector 9. In the present embodiment, the orientation and pitch of the holographic rectangle pattern on the left side of the line 91 are provided to direct the 650 nm diffracted beam to the photodiode portion Rb, while the orientation and pitch of the holographic rectangle pattern on the right side of the line 91 are provided to direct the 650 nm diffracted beam to the photodiode portion Ra. In accordance with the push-pull method, the photodetector 9 receives the 650 nm diffracted beams from the tracking detection region 13 of the hologram, and generates a tracking error signal based on the difference between the received beams on the photodiode portions Ra and Rb.

Figure 8:
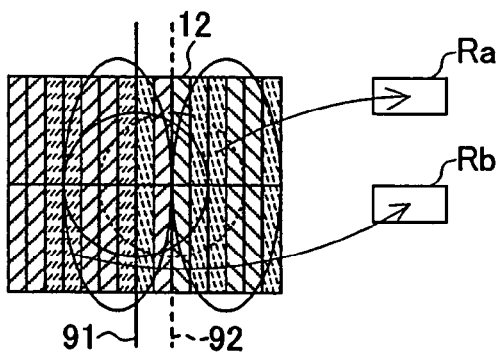
FIG. 8 is a diagram for explaining a tracking detection region of a hologram used when performing the push-pull method of tracking detection.

FIG. 8 shows a 780 nm laser tracking detection region 120 of the hologram used when performing the push-pull method of tracking detection. As shown in FIG. 8, the tracking detection region 12 comprises a pattern of rectangles, each having holographic stripes, which are symmetrically arranged on the hologram with respect to the beam partition line 92. As shown in FIG. 8, the holographic rectangles of the 780 nm laser tracking detection region 12 and the holographic rectangles of the 650 nm laser tracking detection region 13 are alternately arrayed on the hologram in the present embodiment.

The tracking detection region 12 of the hologram diffracts the reflection beam of the 780 nm laser beam to a photodiode portion Ra and a photodiode portion Rb of the photodetector 9. In the present embodiment, the orientation and pitch of the holographic rectangle pattern on the left side of the line 92 are provided to direct the 780 nm diffracted beam to the photodiode portion Rb, while the orientation and pitch of the holographic rectangle pattern on the right side of the line 92 are provided to direct the 780 nm diffracted beam to the photodiode portion Ra. In accordance with the push-pull method, the photodetector 9 receives the diffracted beams from the tracking detection region 12 of the hologram and generates a tracking error signal based on the difference between the signal intensities of the received beams on the photodiode portions Ra and Rb.

Figure 9:
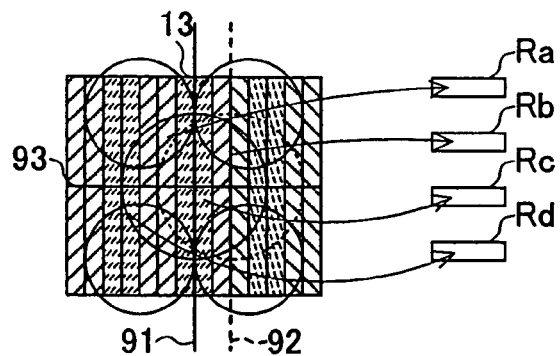
FIG. 9 is a diagram for explaining a DPD method of tracking detection used by the optical pickup apparatus of the invention.

FIG. 9 shows a DPD method of tracking detection used by the optical pickup apparatus of the invention. As shown in FIG. 9, when the DPD method of tracking detection is used by the optical pickup apparatus of the invention, the hologram is partitioned into four regions. As for the tracking detection of the 650 nm laser beam, the hologram is divided into two halves by the beam partition line 91, and each half of the hologram is further divided into two quarters by a beam partition line 93. The tracking detection region 13 comprises a pattern of rectangles, each having holographic stripes, which are symmetrically arranged on the hologram with respect to the beam partition line 91 and further with respect to the beam partition line 93. The tracking detection region 13 of the hologram diffracts the reflection beam of the 650 nm laser beam to four photodiode portions Ra, Rb, Rc and Rd of the photodetector 9. In the present embodiment, the orientation and pitch of the holographic rectangle pattern on the left side of the line 91 and on the upper side of the line 93 are provided to direct the 650 nm diffracted beam to the photodiode portion Ra, the orientation and pitch of the holographic rectangle pattern on the right side of the line 91 and on the upper side of the line 93 are provided to direct the 650 nm diffracted beam to the photodiode portion Rb. Similarly, the orientation and pitch of the holographic rectangle pattern on the right side of the line 91 and on the lower side of the line 93 are provided to direct the 650 nm diffracted beam to the photodiode portion Rc, the orientation and pitch of the holographic rectangle pattern on the left side of the line 91 and on the lower side of the line 93 are provided to direct the 650 nm diffracted beam to the photodiode portion Rd.

In accordance with the DPD method, the photodetector 9 receives the 650 nm diffracted beams from the tracking detection 5 region 13 of the hologram, and generates a tracking error signal based on the signal intensities of the received beams on the photodiode portions Ra, Rb, Rc and Rd. When the optical pickup apparatus of the present embodiment accesses a DVD medium, the photodetector 9 outputs the tracking error signal in accordance with the above-described DPD tracking detection method.

Figure 10:
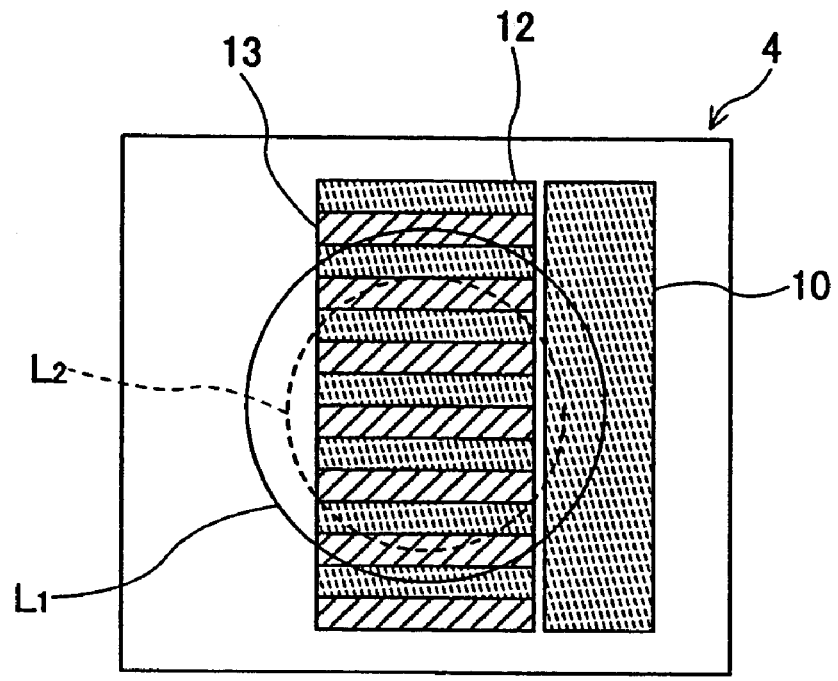
FIG. 10 is a diagram for explaining an example of the hologram in the optical pickup apparatus of the invention.
Figure 11:
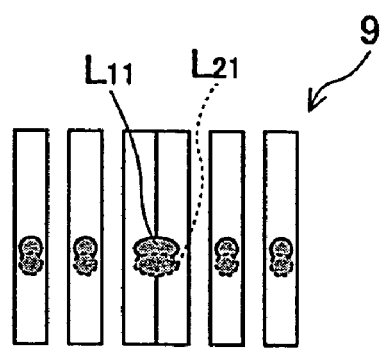
FIG. 11 is a diagram for explaining a relationship between the light-receiving surface of the photodetector and the beam spots of the diffracted laser beams.

Next, FIG. 10 shows an example of the first hologram 4 in the optical pickup apparatus of the invention. FIG. 11 shows a relationship between the light-receiving surface of the photodetector 9 and the beam spots of the diffracted laser beams.

As shown in FIG. 10, in order to perform the tracking detection (by the push-pull method or the DPD method), the example of the first hologram 4 comprises a 780 nm laser tracking detection region 12 and a 650 nm laser tracking detection region 13 wherein the holographic-stripe rectangles of the region 12 and the holographic-stripe rectangles of the region 13 are alternately arranged in the center of the first hologram 4. Further, in order to perform the focusing detection, the example of the first hologram 4 comprises a 780 nm laser focusing detection region 10 which is arranged at an off-center portion of the first hologram 4.

As shown in FIG. 11, because of such structure of the first hologram 4, the photodetector 9 receives both the 650 nm diffracted beams from the tracking detection region 13 and the 780 diffracted beams from the tracking detection region 12. In the example shown in FIG. 9, the beam spot L11 and the beam spot L21 are actually located at the same position on the light-receiving surface of the photodetector 9.

In the above-described example of the first hologram 4 shown in FIG. 10, the holographic-stripe rectangles of the region 12 and the holographic-stripe rectangles of the region 13 are alternately arranged. As described earlier, when the LD 1 is turned ON, the 650 nm laser beam L1, incident to the 780 nm laser tracking detection region 12 of the first hologram 4, is not diffracted to the light-receiving surface of the photodetector 9, and it is not subjected to the photo-detection of the optical pickup apparatus.

Figure 12:
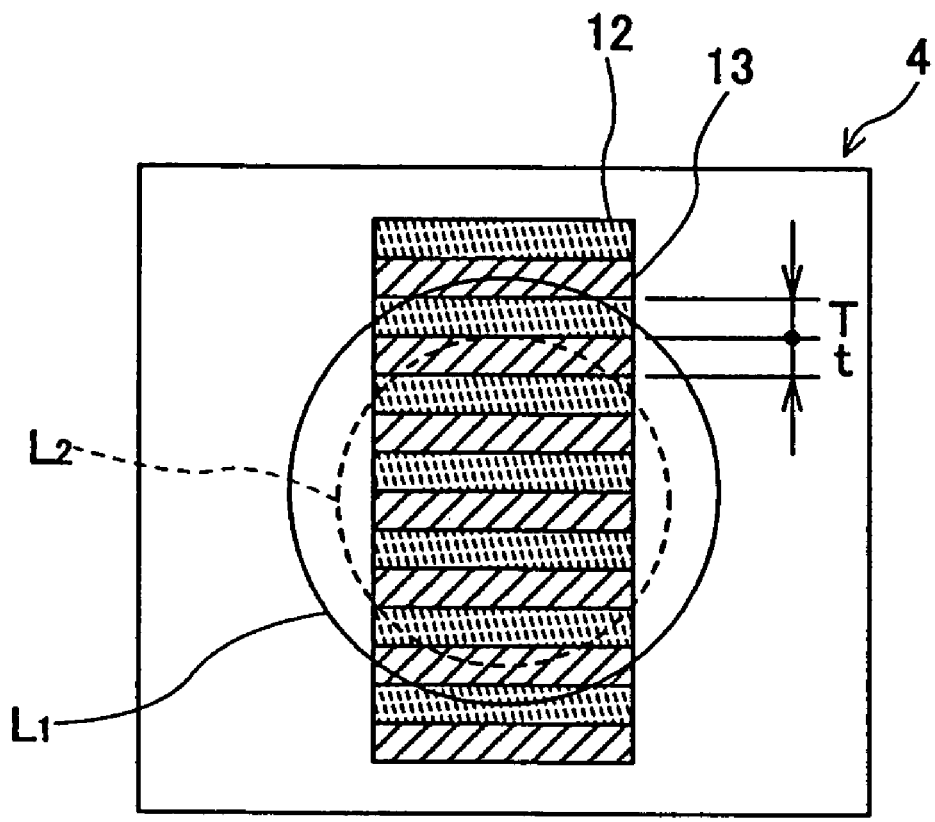
FIG. 12 is a diagram for explaining tracking detection hologram regions of the hologram in the optical pickup apparatus of the invention.
Figure 12:
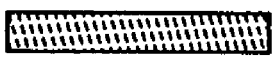
Figure 12:

FIG. 12 shows the details of the tracking detection hologram regions of the first hologram 4 in the optical pickup apparatus of the invention. Suppose that "t" indicates a width of one of the holographic stripe rectangles of the region 13, and "T" indicates a width of one of the holographic stripe rectangles of the region 12. When t=T, the loss of one of the 650 nm laser beam and 780 nm laser beam is approximately 50%. However, the sensitivity of the photodetector 9 for the 780 nm laser beam is higher than that of the photodetector 9 for the 650 nm laser beam, the CD reproducing power is larger than the DVD reproducing power, and the beam effective diameter of the objective lens 7 for the 780 nm laser beam is smaller than that of the objective lens 7 for the 650 nm laser beam.

In order to make the signal intensity of the photodetector 9 for each of the 650 nm and 780 nm laser beams compatible, it is preferred that the width "T" of one of the holographic stripe rectangles of the region 12 is larger than the width "t" of one of the holographic stripe rectangles of the region 13. By this configuration, it is possible that the optical pickup apparatus of the present embodiment provides good photo-detection performance and high-speed recording/reproducing capabilities, regardless of whether the 650 nm laser beam of the LD 1 or the 780 nm laser beam of the LD 3 is used to access the recording medium 8.

Figure 13:
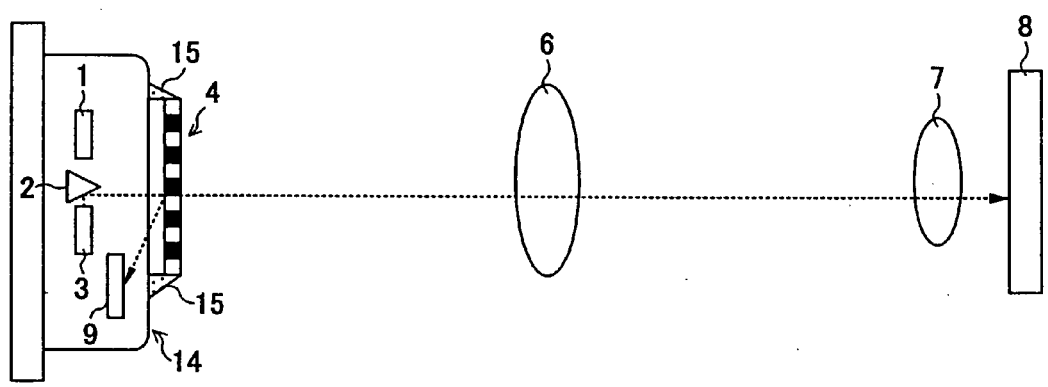
FIG. 13 is a diagram of a holographic unit mounted on an optical module in the optical pickup apparatus of the invention.

FIG. 13 shows a holographic unit mounted on an optical module in the optical pickup apparatus of the invention.

To produce a small-size optical pickup apparatus with increased reliability, the first hologram 4 and the second hologram 5 in the present embodiment are integrally provided in a single LD/PD optical module 14. As shown in FIG. 13, the LD 1, the coupling mirror 2, the LD 3 and the photodetector 9 are already contained in the optical module 14.

When attaching the first hologram 4 to the optical module 14, the first hologram 4 is temporarily positioned onto a cap of the optical module 14 and the LD 3 is turned ON to emit the 780 nm laser beam. After the positioning of the first hologram 4 on the optical module 14 is adjusted so as to zero the 780 nm laser focusing and tracking detection offsets, the first hologram 4 is fixed to the cap of the optical module 14 by using adhesive agent 15.

Figure 14:
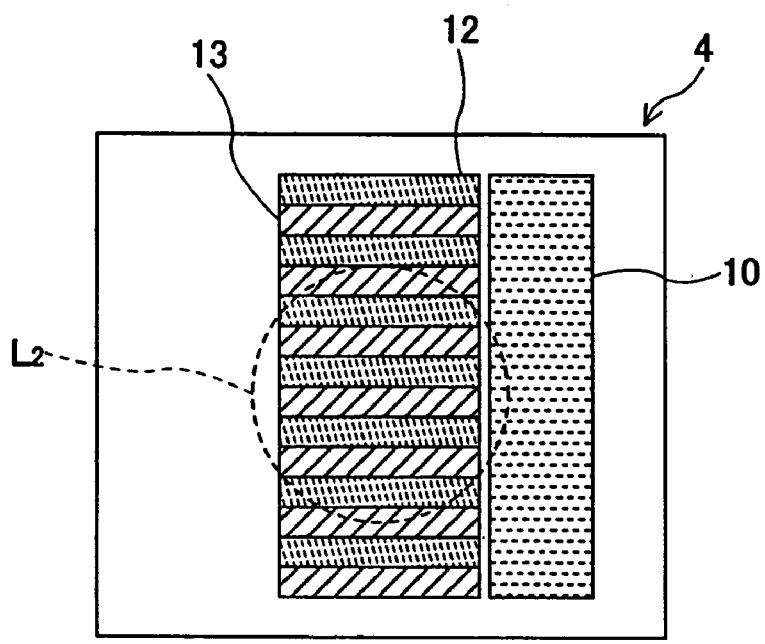
FIG. 14 is a diagram for explaining focusing and tracking detection regions of the first hologram.

FIG. 14 shows focusing and tracking detection regions of the first hologram 4 in the present embodiment. As shown in FIG. 14, the first hologram 4 comprises a 780 nm laser focusing detection region 10, a 780 nm laser tracking detection region 12, and a 650 nm laser tracking detection region 13. In the present embodiment, after the positioning of the first hologram 4 on the optical module 14 is adjusted so as to zero the 780 nm laser focusing and tracking detection offsets, the adjustment of the 650 nm tracking detection region 13 is unnecessary. Generally, the requirement of assembly accuracy related to the tracking detection is moderate when compared with the requirement of assembly accuracy related to the focusing detection.

Figure 15:
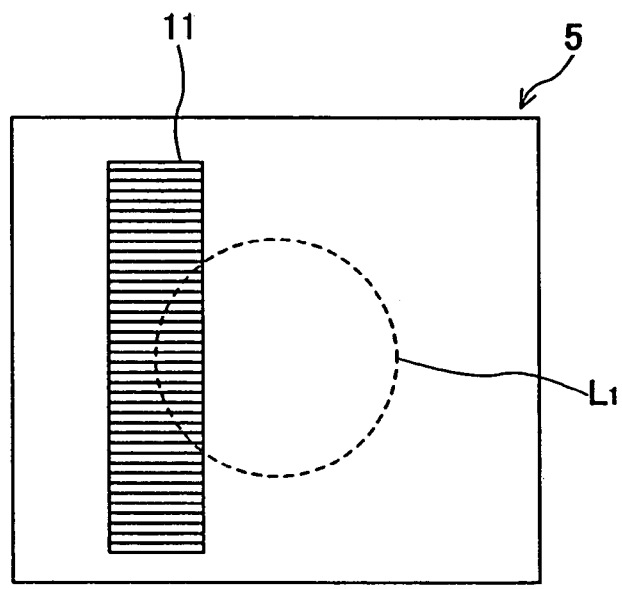
FIG. 15 is a diagram for explaining a focusing detection region of the second hologram.
Figure 15:
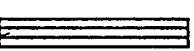

FIG. 15 shows a focusing detection region of the second hologram 5 in the present embodiment. As shown in FIG. 15, the second hologram 5 comprises a 650 nm laser focusing detection region 11.

When attaching the second hologram 5 to the optical module 14, the second hologram 5 is temporarily positioned onto the first hologram 4 in the optical module 14, and the LD 1 is turned ON to emit the 650 nm laser beam. After the positioning of the second hologram 5 on the optical module 14 is adjusted so as to zero the 650 nm laser focusing detection offsets, the second hologram 5 is fixed to the optical module 14 by using adhesive agent 15.

Figure 16:
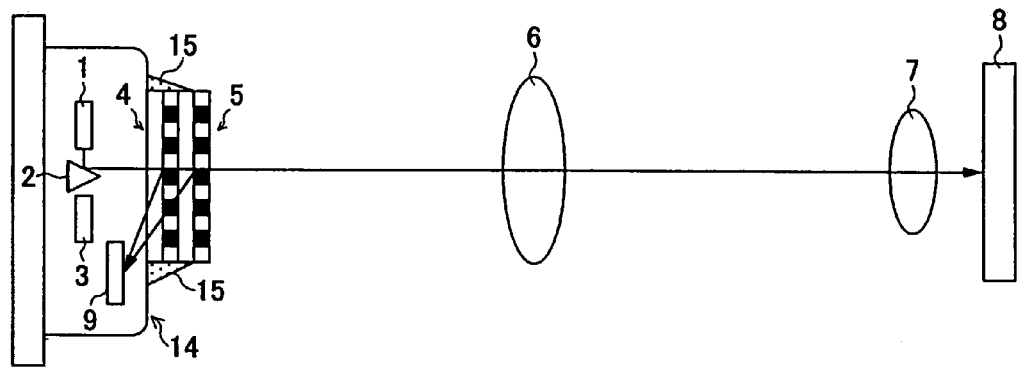
FIG. 16 is a diagram of one embodiment of the optical pickup apparatus of the invention.

FIG. 16 shows one embodiment of the optical pickup apparatus of the invention in which the holographic unit, including the first hologram and the second hologram, is mounted on the optical module. After the above-described assembly procedures are performed, the first hologram 4 and the second hologram 5 are integrally provided in the optical module 14. The assembly procedures are remarkably simplified, which facilitates the volume production of the optical pickup devices. The optical pickup device of the present embodiment is effective in producing a small-size optical pickup apparatus with increased reliability.

In the optical pickup apparatus of FIG. 16, the second hologram 5 is snugly fitted to the first hologram 4 with no spacing therebetween. The opposing glass surfaces of the two holograms 4 and 5 are in contact, and when the positioning of the second hologram 5 on the optical module 14 is adjusted, the position of the first hologram 4 on the optical module 14 may be changed due to the contact. It is desirable to maintain a high level of the assembly accuracy of the holographic unit.

Figure 17:
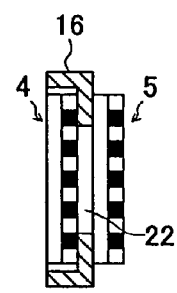
FIG. 17 is a diagram of an example of the holographic unit in the optical pickup apparatus of the invention.
Figure 18:
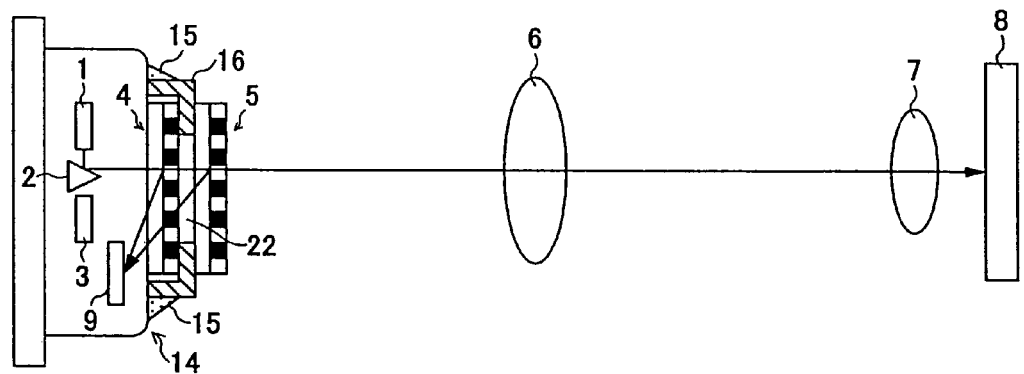
FIG. 18 is a diagram of another embodiment of the optical pickup apparatus of the invention in which the holographic unit of FIG. 17 is incorporated.

FIG. 17 shows an example of the holographic unit in the optical pickup apparatus of the invention, which is provided to eliminate the above problem. FIG. 18 shows one embodiment of the optical pickup apparatus of the invention in which the holographic unit of FIG. 17 is incorporated.

As shown in FIG. 17, in the holographic unit of the present example, the first hologram 4 and the second hologram 5 are arranged with a spacing 22 between the opposing surfaces of the two holograms 4 and 5, by inserting an intermediate member 16. In the present embodiment, the opposing surfaces of the two holograms 4 and 5 are not in contact and detached from each other by the spacing 22. Even when the positioning of the second hologram 5 on the optical module 14 is adjusted, the position of the first hologram 4 on the optical module 14 can be retained. Hence, the optical pickup apparatus of the present embodiment is effective in maintaining a high level of the assembly accuracy of the holographic unit.

Further, in one preferred embodiment of the optical pickup apparatus of the invention, the first hologram 4 and the second hologram 5 are respectively configured into a first polarizing hologram and a second polarizing hologram. Each of the first hologram 4 and the second hologram 5 passes through the laser beam emitted by the laser diode and diffracts the reflection beam from the recording medium to the photodetector. Such functions of the holograms 4 and 5 are effectively achieved by the polarizing holograms.

When the first and second polarizing holograms are used in the optical pickup apparatus, about 90 percent of the laser beam emitted by one of the LD 1 and the LD 3 transmits through the polarizing holograms, and about 40 percent of the reflection beam from the recording medium 8 is diffracted by the polarizing holograms to the photodetector 9 (the 1st order diffracted beam). In a case of a holographic grating, when 95 percent of the emission laser beam transmits through the holographic grating, the holographic grating usually can diffract only 5 percent of the reflection beam to the photodetector 9. Hence, the optical pickup apparatus of the present embodiment provides better photo-detection performance.

Figure 19:
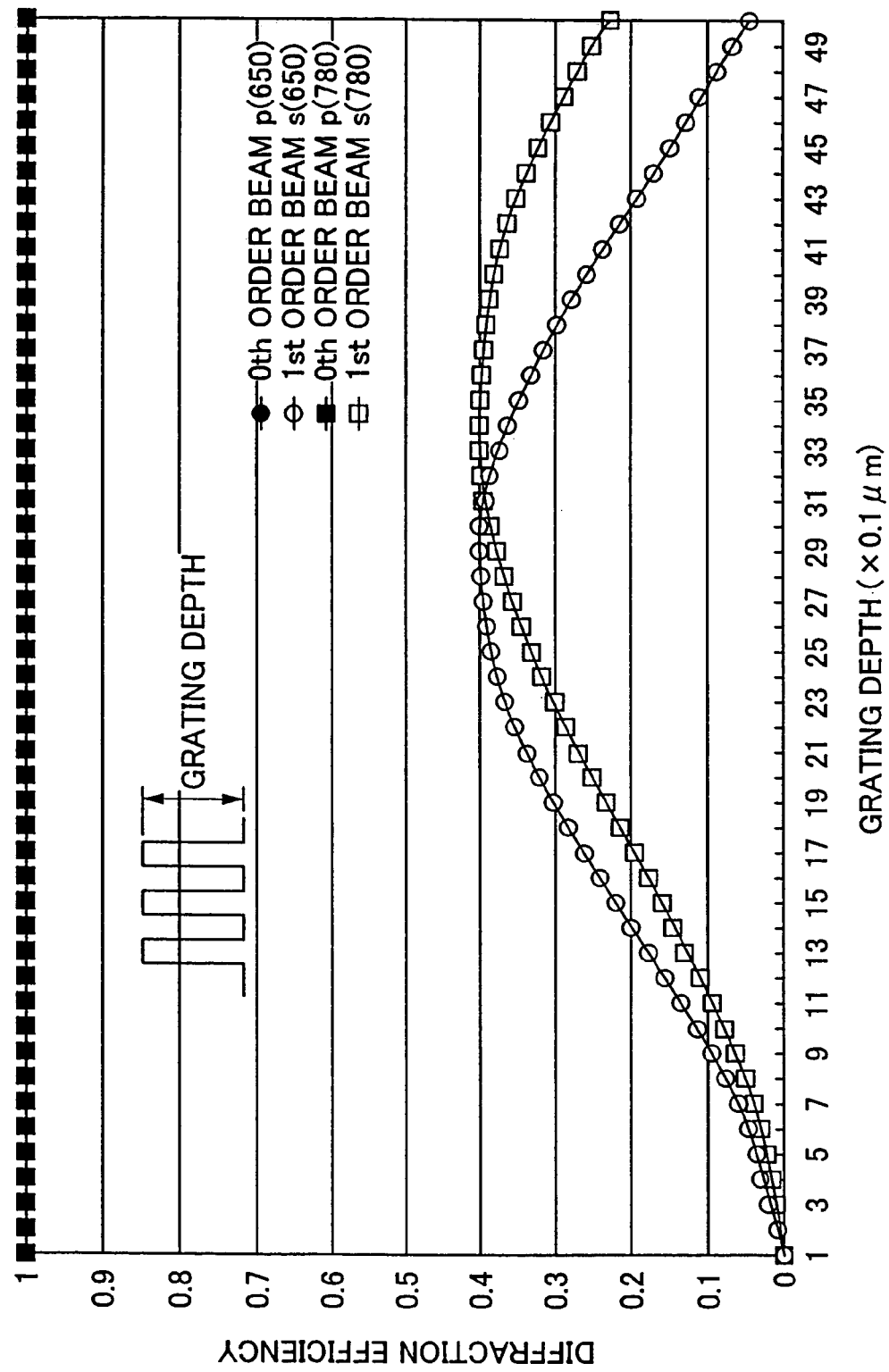
FIG. 19 is a diagram for explaining a relationship between grating depth and diffraction efficiency.

FIG. 19 shows a relationship between grating depth and diffraction efficiency when the first and second polarizing holograms are provided in the optical pickup apparatus of the present embodiment.

In the present embodiment, the 780 nm laser focusing detection region 10 of the first polarizing hologram and the 650 nm laser focusing detection region 11 of the second polarizing hologram are not overlapped. Each of the first and second polarizing holograms has an optimum grating depth for providing a predetermined diffraction efficiency for one of the laser beam wavelengths 650 nm and 780 nm of the laser diodes 1 and 3.

As shown in FIG. 19, in the case of the 650 nm laser beam, when the grating depth is set at about 2.9 μm, the polarizing hologram has the highest diffraction efficiency. In the case of the 780 nm laser beam, when the grating depth is set at about 3.5 μm, the polarizing hologram has the highest diffraction efficiency. In the present embodiment, the 780 nm laser focusing detection region 10 of the first polarizing hologram has the optimum grating depth of about 3.5 μm, and the 650 nm laser focusing detection region 11 of the second polarizing hologram has the optimum grating depth of about 2.9 μm. The first and second polarizing holograms are formed on separate substrates, and obtaining the optimum grating depth of each polarizing hologram can be easily attained.

Next, a description will be given of a double refraction film used to produce a polarizing hologram for use in the optical pickup apparatus of the invention.

The double refraction materials that are currently dominant are $LiNbO_3$ and $CaCO_3$. However, producing a polarizing hologram from such materials is expensive. It is desirable to provide an inexpensive method of producing a polarizing hologram having a double refraction film. To suit the demand, an oblique deposition method has been proposed (see "Phase Difference Film" by Taga et al in Surface Technology, vol. 46, no. 7, 1995).

Figure 20:
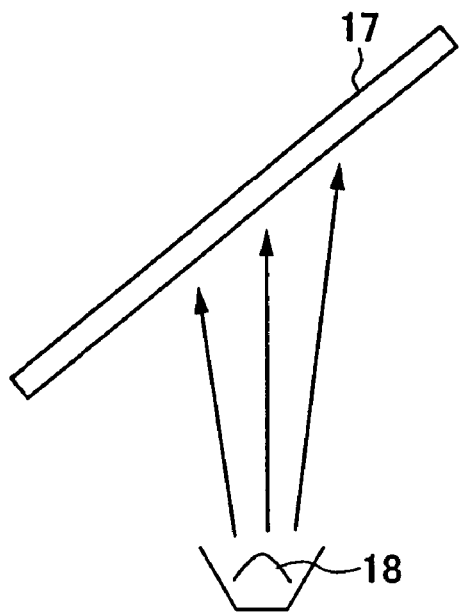
FIG. 20 is a diagram for explaining an oblique deposition used to produce a polarizing hologram of the optical pickup apparatus of the invention.

FIG. 20 shows an oblique deposition used to produce a polarizing hologram of the optical pickup apparatus of the invention. As shown in FIG. 20, a substrate 17 is held at an oblique position relative to a source material 18, and, by using a vacuum deposition process, a film of the source material 18 is deposited on the substrate 17. The resulting film is called the obliquely deposited film.

In the oblique deposition method, examples of the source material 18 include dielectric materials such as $Ta_2O_5$, $SiO_2$. For example, the obliquely deposited film on the substrate 17 has a double refraction coefficient $\Delta n$ (=np−ns) on the order of 0.08. It is equivalent to the double refraction coefficient $\Delta n$ of $LiNbO_3$ crystals. By using the vacuum deposition process, it is possible to provide an inexpensive method of producing the polarizing hologram having the double refraction film.

Moreover, the obliquely deposited film has a thickness on the order of 10 μm, while the thickness of $LiNbO_3$ crystals is in the range from 500 μm to 1000 μm. When the polarizing hologram using the obliquely deposited film is placed on an optical path of a diverging laser beam, the amount of aberration produced by the polarizing hologram is very small. In addition, the obliquely deposited film is a kind of phase difference film, and it may be used to produce a quarter-wave plate.

There is another inexpensive method of producing a polarizing hologram having double refraction film.

Figure 21:
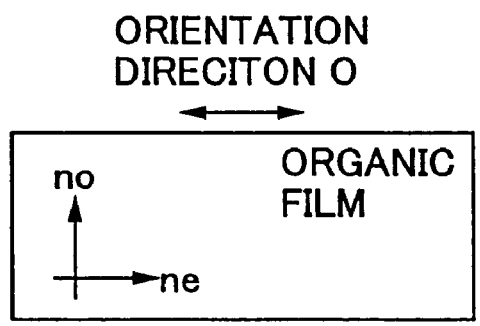
FIG. 21 is a diagram for explaining an oriented organic film used in the holographic unit of the optical pickup apparatus.

FIG. 21 shows an oriented organic film used in the polarizing hologram of the optical pickup apparatus. See "Development And Characteristics Of Polyimid Optical Wave Plate" by Sawada et al in the Journal of the Institute of Electronics, Information And Communication Engineers August 1994.

As shown in FIG. 21, an organic film (e.g., polyimid or polycarbonate) is axially oriented in the direction "O" under a given temperature condition. In the oriented organic film, the refraction index of the direction "no" and the refraction index of the surface direction "ne" are different from each other, and the oriented organic film has double refraction properties. The thus prepared double refraction film is subjected to etching, so that a hologram pattern is formed on the organic film. Further, the surface of the resulting holographic unit is flattened by using a material of an isotropic refraction index. Hence, a polarizing hologram having the double refraction film can be produced with low cost. In addition, the oriented organic film may be used to produce a quarter-wave plate.

The optical pickup apparatus, which uses the polarizing hologram, requires a quarter-wave plate in order to increase the level of photo-detection performance. Suppose that, in the present embodiment, a first laser beam having the wavelength 650 nm and a second laser beam having the wavelength 780 nm are emitted by the laser diode 1 and the laser diode 3, respectively. It is desirable that a 90-degree phase difference of the reflection beams can be created for both the first and second laser beams by using a single quarter-wave plate. However, it is practically impossible to provide such a quarter-wave plate. In the present embodiment, a common quarter-wave plate that provides a nearly 90-degree phase difference of the reflection beams for each of the first and second laser beams is used, and the tolerance of the signal intensity of the reflection beams for each of the first and second laser beams are predetermined.

Figure 22:
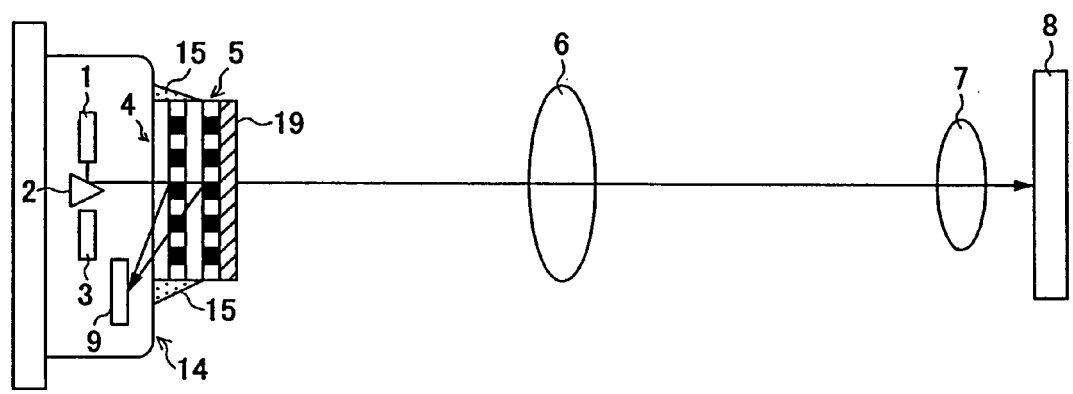
FIG. 22 is a diagram of another embodiment of the optical pickup apparatus of the invention.

FIG. 22 shows another embodiment of the optical pickup apparatus of the invention, which uses a common quarter-wave plate 19 provided between the polarizing holograms 4 and 5 and the optical recording medium 8. As shown in FIG. 22, in the present embodiment, the common quarter-wave plate 19 and the polarizing holograms 4 and 5 are integrally mounted onto the LD/PD optical module 14. In addition, the common quarter-wave plate 19 is a kind of phase difference film, the obliquely deposited film of FIG. 20 or the oriented organic film of FIG. 21 may be used to produce the common quarter-wave plate 19.

A conventional quarter-wave plate is made from a quartz-crystal plate, which is about 1 mm thick and cause the aberration of laser beams. However, the obliquely deposited film or the oriented organic film has a thickness on the order of 10 μm, and the amount of aberration produced by the common quarter-wave plate 19 of the obliquely deposited film or the oriented organic film is very small.

Figure 23:
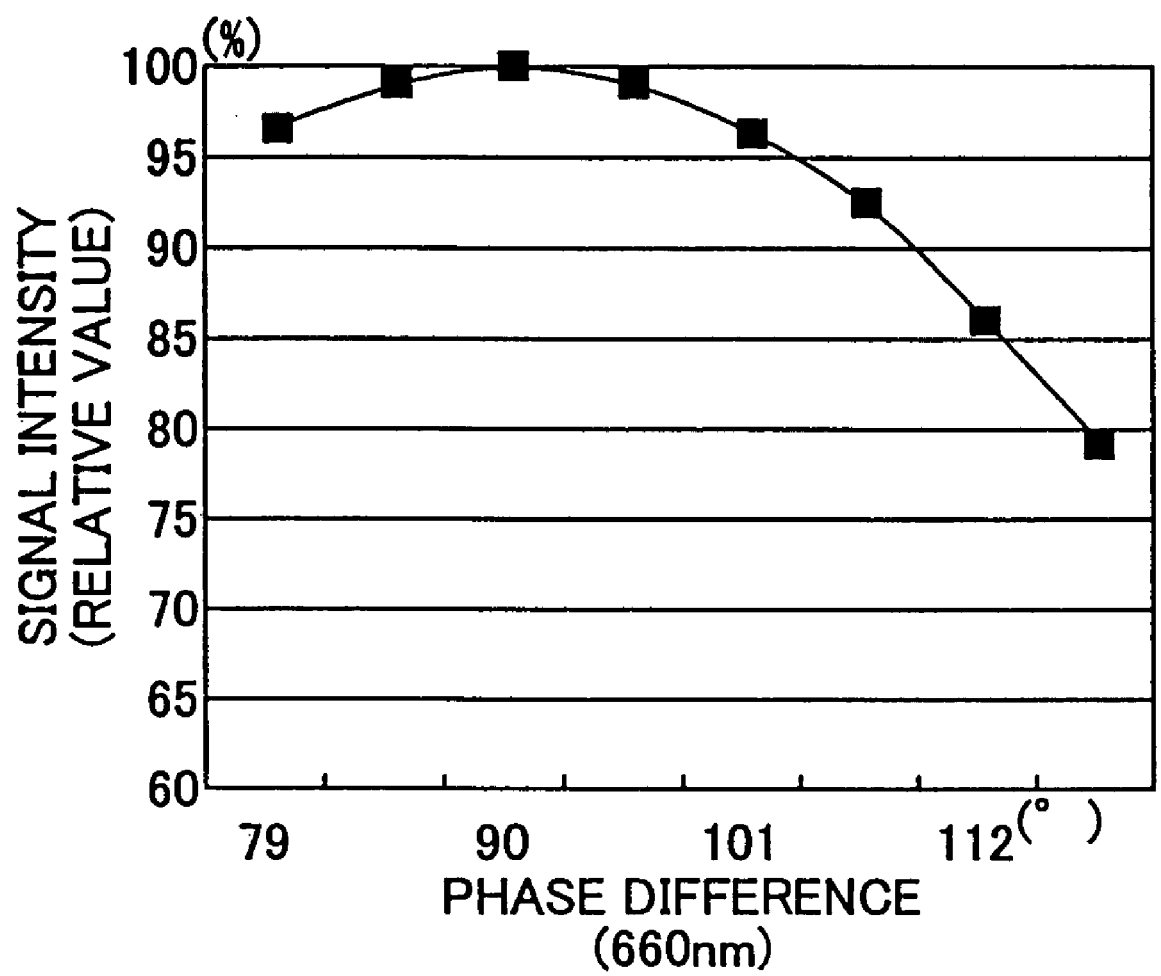
FIG. 23 is a diagram showing a relationship between 660 nm laser phase difference and signal intensity.
Figure 24:
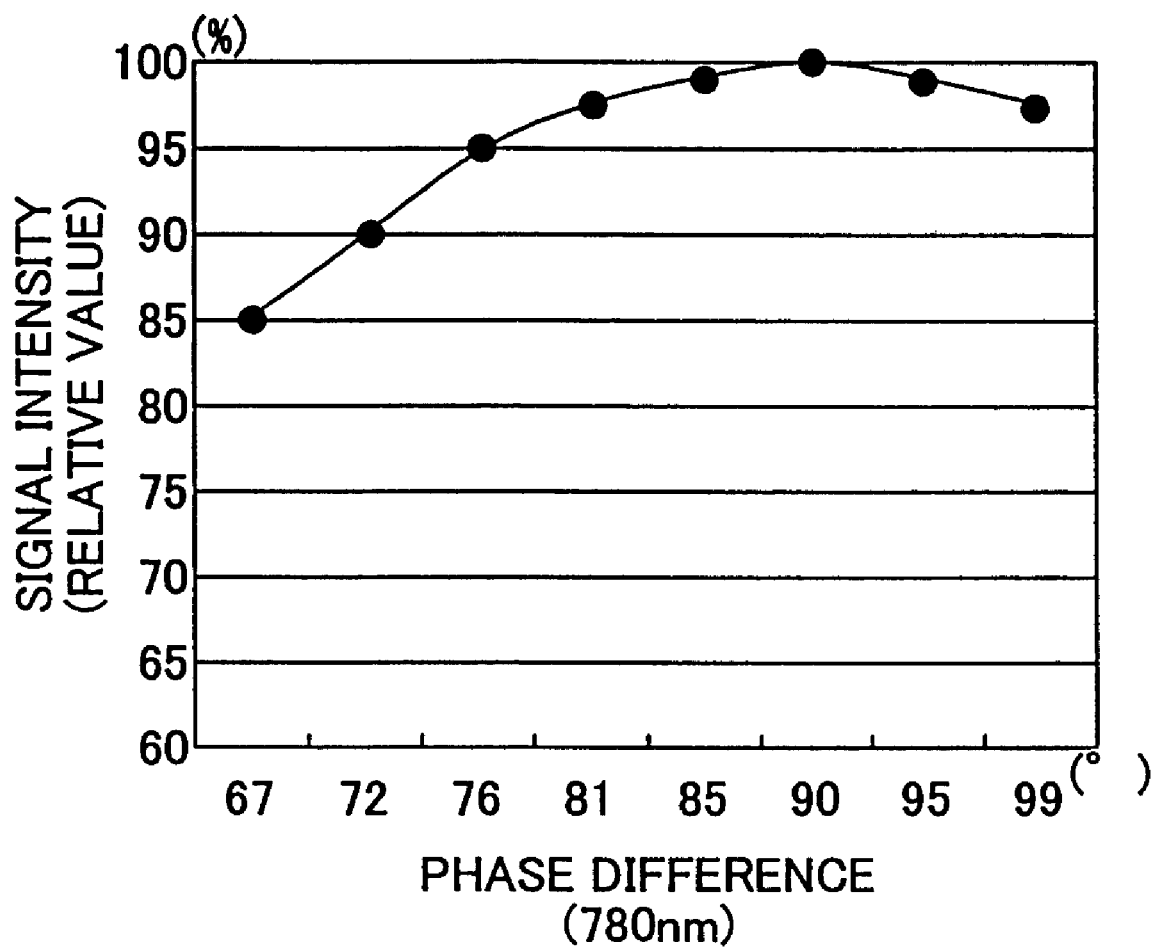
FIG. 24 is a diagram showing a relationship between 780 nm laser phase difference and signal intensity.

FIG. 23 shows a relationship between 660 nm laser phase difference and signal intensity. FIG. 24 shows a relationship between 780 nm laser phase difference and signal intensity.

The deviation of the phase difference of the laser beams from 90 degrees is likely to lower the signal intensity at the photodetector 9 of the optical pickup apparatus. If the signal intensity is lowered, the recording/reproducing capabilities of the optical pickup apparatus are degraded. In order to eliminate the problem, suppose that the tolerance of the signal intensity for each of the first and second laser beams in the present embodiment are predetermined to be less than 10%. As shown in FIG. 23, the permissible maximum level of the phase difference for the first laser beam having the wavelength 660 nm is 109 degrees. As shown in FIG. 24, the permissible minimum level of the phase difference for the second laser beam having the wavelength 780 nm is 71 degrees. Hence, in the present embodiment, the tolerance of the phase difference of the reflection beams for the first and second laser diodes 1 and 3 is in a range of 90±19 degrees.

Figure 25:
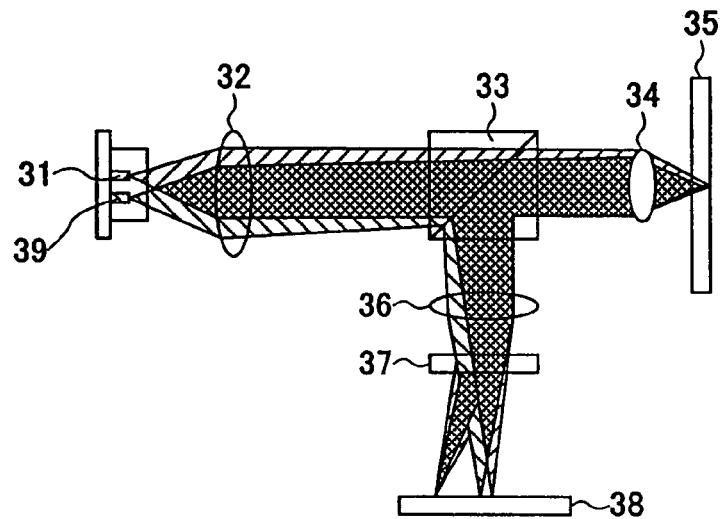
FIG. 25 is a diagram of another embodiment of the optical pickup apparatus of the invention.
Figure 26:
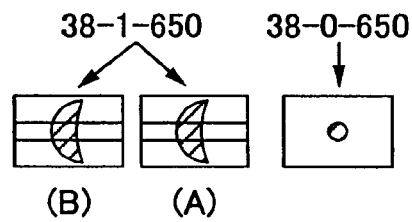
FIG. 26 is a diagram showing a light receiving condition of a photodetector in the optical pickup apparatus of FIG. 25.
Figure 27:
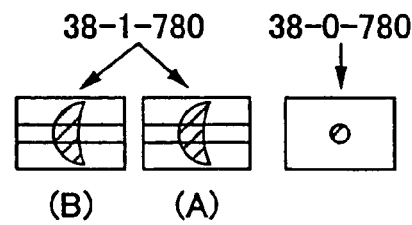
FIG. 27 is a diagram showing a light receiving condition of the photodetector in the optical pickup apparatus of FIG. 25.

Next, FIG. 25 shows another embodiment of the optical pickup apparatus of the invention. FIG. 26 shows a light-receiving condition of a photodetector for diffracted and transmission beams of a first laser beam in the optical pickup apparatus of FIG. 25. FIG. 27 shows a light-receiving condition of the photodetector for diffracted and transmission beams of a second laser beam in the optical pickup apparatus of FIG. 25.

As shown in FIG. 25, the optical pickup apparatus of the present embodiment accesses an optical recording medium 35. The recording medium 35 in the present embodiment is, for example, a CD or a DVD. In the optical pickup apparatus of the present embodiment, a first laser diode (LD) 31 emits a first laser beam having the wavelength 635 nm or 650 nm. Suppose that the first LD 31 in the present embodiment emits the first laser beam having the wavelength 650 nm. A collimator lens 32 converts the first laser beam into a collimated laser beam, and this collimated laser beam is directed to a beam splitter 33. The first laser beam, collimated by the collimator lens 32, passes through the beam splitter 33 and is incident to an objective lens 34. The objective lens 34 focuses the incident laser beam onto a recording surface of the recording medium 35.

The reflection beam that is reflected from the recording surface of the recording medium 35 is returned along the optical path and it is incident to the beam splitter 33. The beam splitter 33 reflects the incident reflection beam, having the wavelength 650 nm, to a detection lens 36. The detection lens 36 converts the reflected laser beam, received from the beam splitter 33, into a converging laser beam, and this converging laser beam is incident to a holographic unit 37. The holographic unit 37 partially diffracts the incident laser beam to a photodetector 38, and the diffracted beam is incident to a region 38-1-650 of the photodetector 38 (see FIG. 26). In addition, the transmission beam, passed through the holographic unit 37, is incident to a region 38-0-650 of the photodetector 38 (see FIG. 26). The photodetector 38 receives the diffracted and transmission beams from the holographic unit 37 to generate detection signals based on the received beams.

Similarly, in the optical pickup apparatus of FIG. 25, a second LD 39 emits a second laser beam having the wavelength 780 nm. The collimator lens 32 converts the second laser beam into a collimated laser beam, and this collimated laser beam is directed to the beam splitter 33. The second laser beam, collimated by the collimator lens 32, passes through the beam splitter 33 and is incident to the objective lens 34. The objective lens 34 focuses the incident laser beam onto the recording surface of the recording medium 35. The reflection beam that is reflected from the recording surface of the recording medium 35 is returned along the optical path and it is incident to the beam splitter 33. The beam splitter 33 reflects the incident reflection beam, having the wavelength 780 nm, to the detection lens 36. The detection lens 36 converts the reflected laser beam, received from the beam splitter 33, into a converging laser beam, and this converging laser beam is incident to the holographic unit 37. The holographic unit 37 partially diffracts the incident laser beam to the photodetector 38, and the diffracted beam is incident to a region 38-1-780 of the photodetector 38 (see FIG. 27). In addition, the transmission beam, passed through the holographic unit 37, is incident to a region 38-0-780 of the photodetector 38 (see FIG. 27). The photodetector 38 receives the diffracted and transmission beams from the holographic unit 37 to generate detection signals based on the received beams.

As shown in FIG. 26 and FIG. 27, in the present embodiment, the holographic unit 37 is configured into a holographic grating having a holographic pattern formed on a glass substrate. A first holographic pattern 37a and a second holographic pattern 37b are alternately provided on the holographic unit 37 to diffract the incident 650 nm laser beam to the region 38-1-650 (A) or (B) of the photodetector 38, and the transmission beam from the holographic unit 37 is incident to the region 38-0-650 of the photodetector 38, as shown in FIG. 26. Similarly, the first holographic pattern 37a and the second holographic pattern 37b are alternately provided on the holographic unit 37 to diffract the incident 780 nm laser beam to the region 38-1-780 (A) or (B) of the photodetector 38, and the transmission beam from the holographic unit 37 is incident to the region 38-0-780 of the photodetector 38, as shown in FIG. 27.

Figure 28:
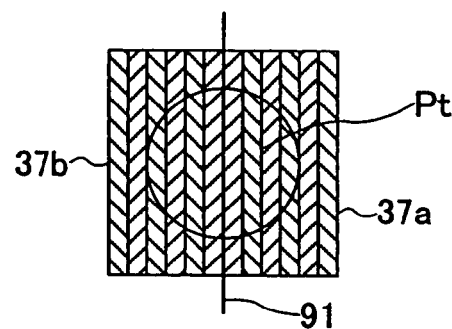
FIG. 28 is a diagram of an example of the holographic unit in the optical pickup apparatus of FIG. 25.

FIG. 28 shows an example of the holographic unit 37 in the optical pickup apparatus of FIG. 25. In the present embodiment, in order to perform the tracking detection, the optical pickup apparatus uses the push-pull method. The holographic unit 37 is a two-pattern division holographic unit. The second holographic pattern 37a is symmetrically provided on the holographic unit 37 with respect to a beam partition line 92 for the second laser beam (the wavelength 780 nm), such that the center of the pattern "Pt'" of the reflection beam of the 780 nm laser beam, received from the recording medium 35, matches with the beam partition line 92.

Figure 29:
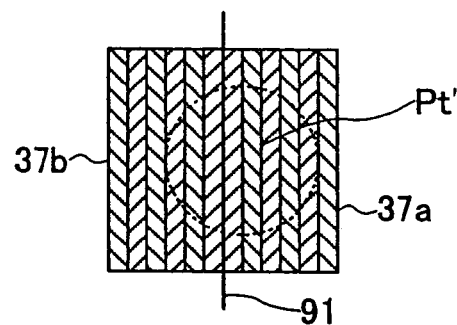
FIG. 29 is a diagram of an example of the holographic unit in the optical pickup apparatus of FIG. 25.

However, as shown in FIG. 29, the center of a pattern "Pt'" of the reflection beam of the 780 nm laser beam at the holographic unit 37, received from the recording medium 35, does not match with the beam partition line 91. In order to suit to the case of the second laser beam (the wavelength 780 nm), as shown in FIG. 30, the second holographic patterns 37b is symmetrically provided on the holographic unit 37 with respect to a beam partition line 92 for the second laser beam (the wavelength 780 nm), such that the center of the pattern Pt' of the reflection beam of the 780 nm laser beam, received from the recording medium 35, matches with the beam partition line 92.

Figure 30:
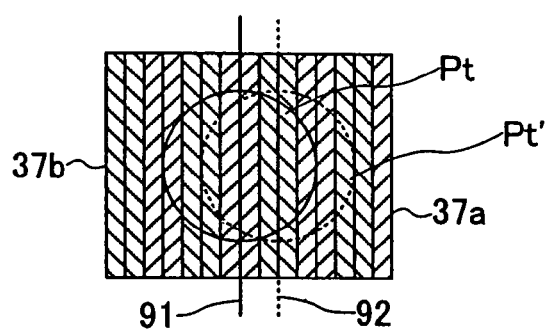
FIG. 30 is a diagram of an example of the holographic unit in the optical pickup apparatus of FIG. 25.
Figure 31:
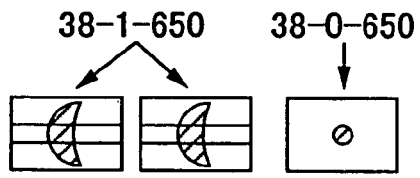
FIG. 31 is a diagram showing a light receiving condition of the photodetector for diffracted and transmission beams of a first laser beam from the holographic unit of FIG. 30.

FIG. 31 shows a light receiving condition of the photodetector 38 for the diffracted and transmission beams of the first laser beam from the holographic unit 37 of FIG. 30. The center of the pattern Pt matches with the beam partition line 91, and the regions 38-1-650 and 38-0-650 of the photodetector 38 receive the diffracted and transmission beams from the holographic unit 37 as shown in FIG. 31, and generate detection signals based on the received beams in accordance with the push-pull method.

Figure 32:
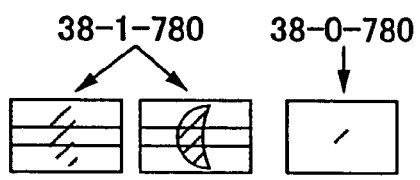
FIG. 32 is a diagram showing a light receiving condition of the photodetector for diffracted and transmission beams of a second laser beam from the holographic unit of FIG. 30.

FIG. 32 shows a light receiving condition of the photodetector 37 for the diffracted and transmission beams of the second laser beam from the holographic unit 37 of FIG. 30. The center of the pattern Pt' matches with the beam partition line 92, and the regions 38-1-780 and 38-0-780 of the photodetector 38 receive the diffracted and transmission beams from the holographic unit 37 as shown in FIG. 32, and generate detection signals based on the received beams in accordance with the push-pull method.

Figure 33:
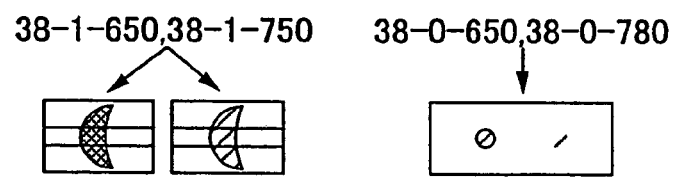
FIG. 33 is a diagram showing a light receiving condition of the photodetector for both the first and second laser beam.

In the above-mentioned embodiment, the regions 38-1-650 and 38-0-650 and the regions 38-1-780 and 38-0-780 are separately provided on the photodetector 38. Alternatively, the reflection beams of the first and second laser beams may be focused on the same regions of the photodetector 38. FIG. 33 shows a light receiving condition of the photodetector for both the first and second laser beams in such embodiment. As shown in FIG. 33, the common regions (38-1-650 and 38-0-650 or 38-1-780 and 38-0-780) of the photodetector 38 receive the diffracted and transmission beams from the holographic unit 37 as shown in FIG. 33, and generate detection signals based on the received beams in accordance with the push-pull method.

Figure 34:
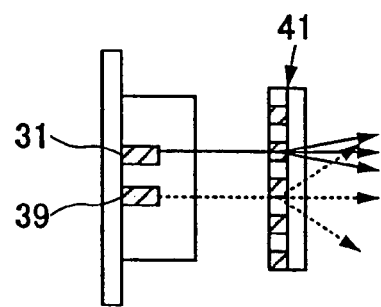
FIG. 34 is a diagram of an LD-common optical module.

FIG. 34 shows an LD-common optical module in another embodiment of the optical pickup apparatus of the invention. As shown in FIG. 34, the first LD 31 for the 650 nm laser beam (used to access a DVD) and the second LD 39 for the 780 nm laser beam (used to access a CD) are integrally mounted on the optical module, and a 3-beam holographic grating 41 is provided in the optical pickup apparatus of the present embodiment. Other elements in the optical pickup apparatus of the present embodiment are essentially the same as corresponding elements in FIG. 25, and a description thereof will be omitted. According to the above-mentioned embodiment, the optical pickup apparatus can provide good photo-detection performance and high-speed recording/reproducing capabilities for both the first and second laser beams.

Figure 35:
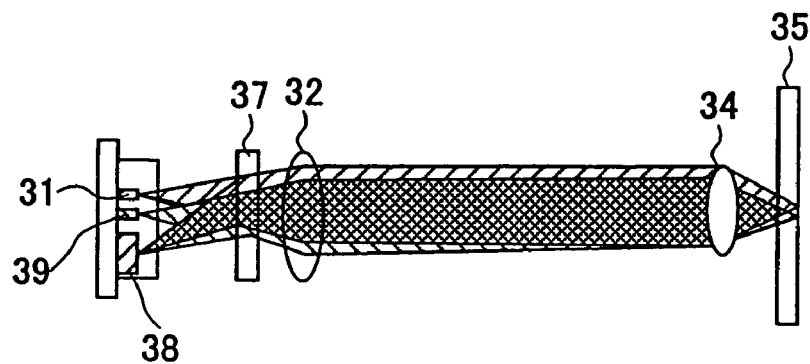
FIG. 35 is a diagram of another embodiment of the optical pickup apparatus of the invention using an LD/PD-common optical module.

FIG. 35 shows another embodiment of the optical pickup apparatus of the invention using an LD/PD-common optical module. As shown in FIG. 35, the first LD 31 for emitting the 650 nm laser beam, the second LD 39 for emitting the 780 nm laser beam, and the photodetector 38 for detecting the reflection beams from the recording medium 35 are integrally mounted on the LD/PD-common optical module. Other elements in the optical pickup apparatus of the present embodiment are essentially the same as corresponding elements in FIG. 25, and a description thereof will be omitted. According to the above-mentioned embodiment, the optical pickup apparatus can provide good photo-detection performance and high-speed recording/reproducing capabilities for both the first and second laser beams.

Figure 36:
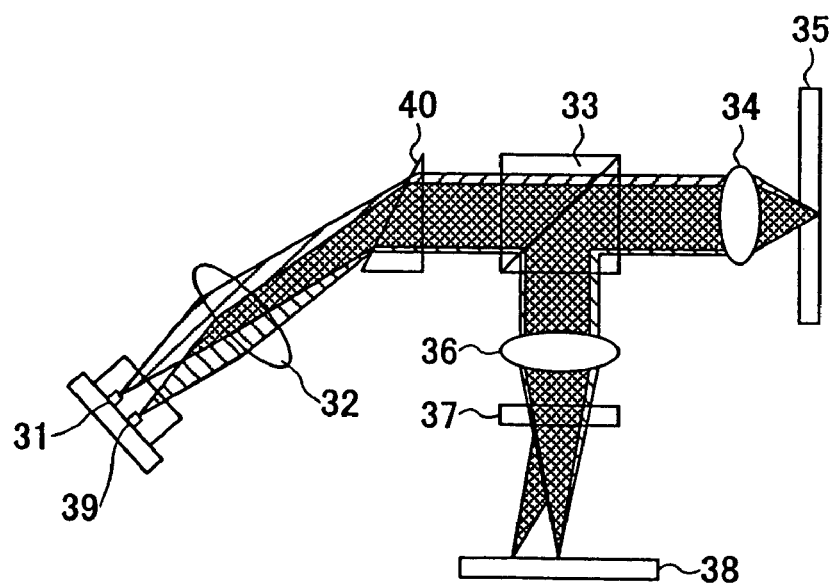
FIG. 36 is a diagram of another embodiment of the optical pickup apparatus of the invention.

FIG. 36 shows another embodiment of the optical pickup apparatus of the invention in which a beam-shape compensating prism and the hologram are provided.

In the optical pickup apparatus of FIG. 36, the laser diode 31 emits a first laser beam having the wavelength 650 nm (or 635 nm). The collimator lens 32 converts the incident laser beam into a collimated laser beam, and the collimated laser beam is incident to the beam-shape compensating prism 40. The prism 40 converts the beam shape of the incident laser beam into a circular cross-section beam. The beam splitter 33 passes through the circular cross-section beam from the prism 40. The objective lens 34 focuses the incident laser beam (the circular cross-section) onto the recording surface of the recording medium 35.

The reflection beam that is reflected from the recording surface of the recording medium 35 is returned along the optical path. The beam splitter 33 reflects the incident laser beam to the detection lens 36. The detection lens 36 converts the reflected laser beam into a converging laser beam. The holographic unit 37 partially passes through the converging laser beam from the detection lens 36, and partially diffracts the converging laser beam. The photodetector 38 receives the transmission beam and the diffracted beam from the holographic unit 37, and generates detection signals based on the received beams.

Similarly, in the optical pickup apparatus of FIG. 36, the laser diode 39 emits a second laser beam having the wavelength 780 nm. The collimator lens 32 converts the incident laser beam into a collimated laser beam, and the collimated laser beam is incident to the beam-shape compensating prism 40. The prism 40 converts the beam shape of the incident laser beam into a circular cross-section beam. The beam splitter 33 passes through the circular cross-section beam from the prism 40. The objective lens 34 focuses the incident laser beam (the circular cross-section) onto the recording surface of the recording medium 35.

The reflection beam that is reflected from the recording surface of the recording medium 35 is returned along the optical path. The beam splitter 33 reflects the incident laser beam to the detection lens 36. The detection lens 36 converts the reflected laser beam into a converging laser beam. The holographic unit 37 partially passes through the converging laser beam from the detection lens 36, and partially diffracts the converging laser beam. The photodetector 38 receives the transmission beam and the diffracted beam from the holographic unit 37, and generates detection signals based on the received beams.

Figure 37:
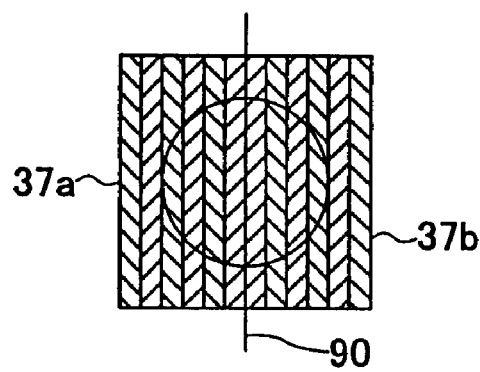
FIG. 37 is a diagram of a holographic unit in the optical pickup apparatus of FIG. 36.

In the present embodiment, the beam-shape compensating prism 40 is provided so that the circular cross-section beams of the first and second laser beams are parallel, and the optical paths of these laser beams accord with each other. FIG. 37 shows an example of the holographic unit 37 in the optical pickup apparatus of FIG. 36. As shown in FIG. 37, the beam spots of the first and second laser beams on the light-receiving surface of the holographic unit 37 substantially accord with each other. The holographic unit 37 has a pattern of rectangles, each having holographic stripes 37*a* and 37*b*, which are symmetrically arranged with respect to the beam partition line 90, which is similar to that shown in FIG. 28. In the present embodiment, it is unnecessary to arrange the holographic pattern with respect to the two beam partition lines 91 and 92 as shown in FIG. 30.

When the holographic unit 37 in the previous embodiment of FIG. 35 is replaced with a polarizing hologram, about 90 percent of the laser-beam emitted by one of the laser diodes 31 and 39 transmits through the polarizing hologram, and about 40 percent of the reflection beam from the recording medium 35 is diffracted by the polarizing hologram to the photodetector 38 (the 1st order diffracted beam). According to such embodiment, it is possible to provide better photo-detection performance of the optical pickup apparatus.

Further, the optical pickup apparatus, which uses a polarizing hologram or a polarizing beam splitter, requires a quarter-wave plate, in order to increase the level of photo-detection performance. It is desirable that a 90-degree phase difference of the reflection beams can be created for both the first and second laser beams by using a single quarter-wave plate. However, it is practically impossible to provide such a quarter-wave plate. In the present embodiment, a common quarter-wave plate that provides a nearly 90-degree phase difference of the reflection beams for each of the first and second laser beams is used, and the tolerance of the signal intensity of the reflection beams for each of the first and second laser beams are predetermined.

Figure 38:
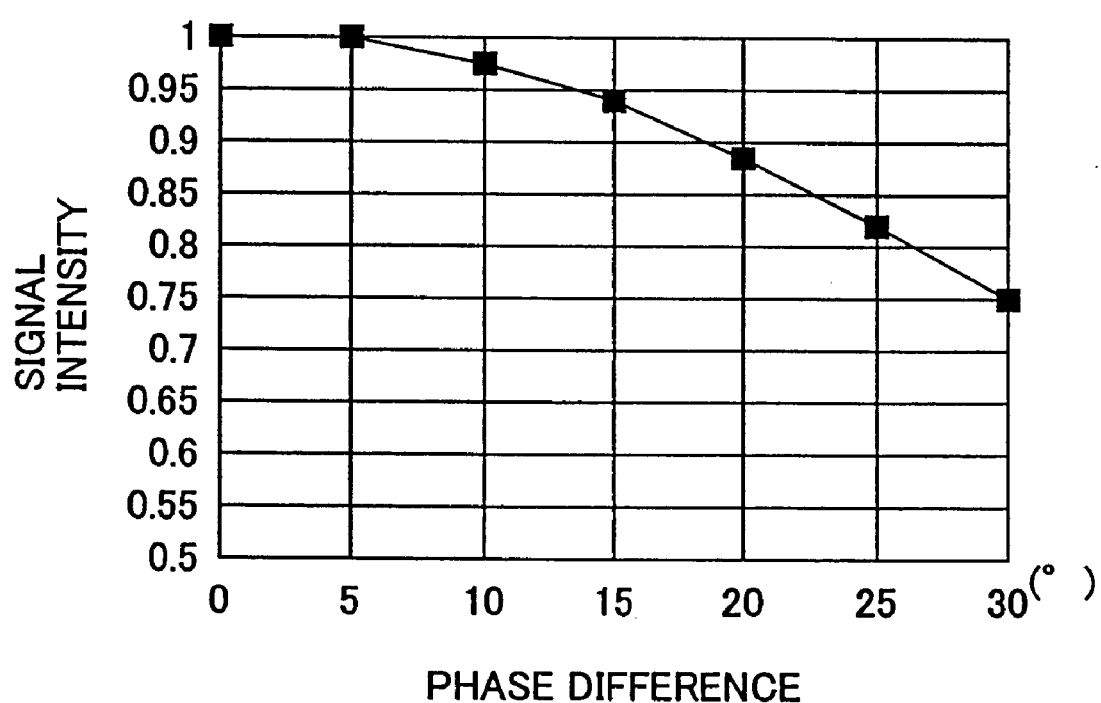
FIG. 38 is a diagram for explaining a relationship between phase difference and signal intensity.

FIG. 38 shows a relationship between phase difference and signal intensity. The deviation of the phase difference of the laser beams from 90 degrees is likely to lower the signal intensity at the photodetector of the optical pickup apparatus. If the signal intensity is lowered, the recording/reproducing capabilities of the optical pickup apparatus are degraded. In order to eliminate the problem, suppose that the tolerance of the signal intensity for each of the first and second laser beams in the present embodiment are predetermined to be less than 10%. As shown in FIG. 38, the tolerance of the phase difference of the reflection beams for the first and second laser diodes is in a range of 90±19 degrees.

The present invention is not limited to the above-described embodiments, and variations and modifications may be made without departing from the scope of the present invention.

Further, the present invention is based on Japanese priority application No.2000-240759, filed on Aug. 9, 2000, Japanese priority application No.2000-318133, filed on Oct. 18, 2000, and Japanese priority application No.2001-178342, filed on Jun. 13, 2001, the entire contents of which are hereby incorporated by reference.

What is claimed is:

1. An optical pickup apparatus for accessing an optical recording medium, comprising:
   a light source unit emitting one of a plurality of laser beams having different wavelengths, the light source unit including a first laser diode emitting a laser beam having a first wavelength and a second laser diode emitting a laser beam having a second wavelength;
   an optical system focusing said one of the plurality of laser beams, emitted by the light source unit, onto a recording surface of the recording medium;
   a photodetector unit receiving reflection beams, which are reflected from the recording medium in response to said one of the plurality of laser beams focused by the optical system, to generate detection signals from the received reflection beams;
   a holographic unit having a first hologram suited to the first laser diode and a second hologram suited to the second laser diode, the first hologram provided to diffract a reflection beam of the laser beam of the first laser diode to the photodetector, the second hologram provided to diffract a reflection beam of the laser beam of the second laser diode to the photodetector, wherein the first hologram and the second hologram of the holographic unit are respectively configured into a first polarizing hologram and a second polarizing hologram; and
   a common quarter-wave plate provided between the holographic unit and the optical system, and the common quarter-wave plate and the holographic unit being integrally provided in a single optical module.

2. The optical pickup apparatus according to claim 1, wherein the common quarter-wave plate is configured to have a tolerance of phase difference of the reflection beams for the first and second laser diodes in a range of 90+19 degrees.

3. An optical pickup apparatus for accessing an optical recording medium, comprising:
   a light source unit emitting one of a plurality of laser beams having different wavelengths, the light source unit including a first laser diode emitting a laser beam having a first wavelength and a second laser diode emitting a laser beam having a second wavelength;
   an optical system focusing said one of the plurality of laser beams, emitted by the light source unit, onto a recording surface of the recording medium;
   a photodetector unit receiving reflection beams, which are reflected from the recording medium in response to said one of the plurality of laser beams focused by the optical system, to generate detection signals from the received beams; and
   a holographic unit having a first holographic pattern suited to the first laser diode and a second holographic pattern suited to the second laser diode, the first hologram provided to partially diffract a reflection beam of the laser beam of the first laser diode to the photodetector, and the first laser reflection beam partially passing through the first holographic pattern to the photodetector, the second hologram provided to partially diffract a reflection beam of the laser beam of the second laser diode to the photodetector, and the second laser reflection beam partially passing through the second holographic pattern to the photodetector, and
   wherein the first holographic pattern and the second holographic pattern each contain an obliquely deposited film.

4. The optical pickup apparatus according to claim 3 wherein the photodetector is provided to receive the diffracted beams from each of the first holographic pattern and the second holographic pattern of the holographic unit.

5. The optical pickup apparatus according to claim 3 wherein at least the first laser diode and the second laser diode of the light source unit are provided in a single optical module.

6. The optical pickup apparatus according to claim 3 wherein at least the first laser diode and the second laser diode of the light source unit and the photodetector unit are provided in a single optical module.

7. The optical pickup apparatus according to claim 3 wherein the optical system includes a collimator lens converting the laser beam, received from each of the first laser diode and the second laser diode, into a collimated laser beam, and a beam splitter transmitting the collimated laser beam to the recording medium and reflecting the reflection beams from the recording medium to the photodetector unit.

8. The optical pickup apparatus according to claim 3 wherein the holographic unit is configured into a polarizing hologram having the first holographic pattern and the second holographic pattern.

9. The optical pickup apparatus according to claim 8 further comprising a quarter-wave plate provided between the holographic unit and the optical system, and the quarter-wave plate being configured to have a tolerance of phase difference of the reflection beams for the first and second laser diodes in a range of 90±19 degrees.

* * * * *